United States Patent [19]
Moore, Jr.

[11] 3,719,607
[45] March 6, 1973

[54] STABLE POSITIVELY CHARGED ALUMINA COATED SILICA SOLS AND THEIR PREPARATION BY POST-NEUTRALIZATION

[75] Inventor: Earl P. Moore, Jr., Wilmington, Del.

[73] Assignee: E. I. du Pont de Nemours and Company, Wilmington, Del.

[22] Filed: Jan. 29, 1971

[21] Appl. No.: 111,076

Related U.S. Application Data

[63] Continuation-in-part of Ser. No. 831,748, June 9, 1969, abandoned, which is a continuation-in-part of Ser. No. 745,714, July 18, 1968, abandoned.

[52] U.S. Cl. ............................. 252/313 S, 252/313 R
[51] Int. Cl. ........................ B01j 13/00, C01b 33/14
[58] Field of Search ........................ 252/313 S, 313 R

[56] References Cited

UNITED STATES PATENTS

| 3,252,917 | 5/1966 | Mindick et al. | 252/313 S |
| 2,892,797 | 6/1959 | Alexander et al. | 252/313 S |
| 2,702,787 | 2/1955 | Freeland | 252/309 S |
| 2,572,578 | 10/1951 | Trail | 252/313 S |
| 3,007,878 | 11/1961 | Alexander et al. | 252/313 S |

Primary Examiner—Richard D. Lovering
Attorney—James L. Jersild

[57] ABSTRACT

An improved process for preparing a stable positively-charged silica sol is obtained by mixing a negatively charged silica sol with basic aluminum chloride, heating the mixture between 45° to 90°C. and then adding to the mixture an alkali metal base, alkaline earth metal base, ammonia or water soluble organic base in the amount of 0.032 to 0.223 equivalents of base per equivalent of aluminum.

9 Claims, No Drawings

STABLE POSITIVELY CHARGED ALUMINA COATED SILICA SOLS AND THEIR PREPARATION BY POST-NEUTRALIZATION

CROSS REFERENCE TO RELATED APPLICATIONS

This application is a continuation-in-part of U.S. Pat. application Ser. No. 831,748, filed June 9, 1969, now abandoned, which is a continuation-in-part of U.S. Pat. application Ser. No. 745,714, filed July 18, 1968, now abandoned.

BACKGROUND OF THE INVENTION

Positively charged coated silica particles are known to the art as first disclosed in U.S. Pat. No. 3,007,878 to Alexander and Bolt. These novel positively charged coated silica particles have a variety of unique properties. They are distinctly different than the previously known negatively charged silica and modified silica sols. However, stability has presented problems which limited their commercial manufacture.

A method has been proposed to increase the stability of these positively charged particles as represented by U.S. Pat. No. 3,252,917 to Mindick and Thompson. While this patent discloses a new technique for preparing these positively charged particles it is costly and time consuming. The process of Mindick et al. requires a minimum of five steps not including regeneration of the two types of ion exchange resins employed in the process. Further, the process step of mixing deionized silica sol with basic aluminum chloride where the sol's colloidal particles are about 18 millimicrons or less in diameter results in mixtures of high viscosity. Where the product of this step has a solids content of about 22 percent or higher the viscosity reaches levels of about 10,000 centipoises. Such viscous process intermediates are extremely difficult to handle in succeeding process steps. However, Mindick et al. requires as an absolute necessity for stable products the use of deionized silica sols and the final step of removal of anions from the sol. Thus, in order to achieve stable sols with pH's in the range of 4.5 to 6 Mindick et al. teaches a difficult procedure and precludes the use of a more efficient process to achieve comparable or superior results.

This invention permits the efficient production of stable positively charged sols in three steps without encountering any process intermediates having a viscosity higher than about 50 centipoises even for the most concentrated products. Further, the sols of this invention are stable at high conductivities, 30–40,000 micromhos/cm. at 70° F., unlike the sols of Mindick et al., and thus may be used in contact with materials with leachable salts.

SUMMARY OF THE INVENTION

A sol is prepared by mixing a negatively charged silica sol with basic aluminum chloride as taught in U.S. Pat. No. 3,007,878 to Alexander and Bolt. This mixture is then aged by standing at room temperature for several weeks or is heated at a temperature up to the boiling point of water with a resulting pH decrease. (Higher temperatures would be acceptable if no water is lost.) The ageing is conducted until the pH remains essentially constant which generally occurs at a pH of 4.2 or below. The mixture is then stabilized by adding from 0.032 to 0.223 equivalents of an alkali metal base, an alkaline earth metal base, ammonia, water soluble organic bases or mixtures of these bases per equivalent of aluminum. This addition raises the pH to about 4.0 to 6.5. At high dilutions the mixture can be stabilized by addition of 0.25 equivalents of base per equivalent of aluminum. The pH can be as high as 7.0.

DESCRIPTION OF THE PREFERRED EMBODIMENTS

The silica sols used as an initial ingredient are commercially available such as those sold under the registered trademark "Ludox." Typical processes for preparing this type of silica sols are disclosed in Bechtold and Snyder, U.S. Pat. No. 2,574,902; Rule, U.S. Pat. No. 2,577,485 and White, U.S. Pat. No. 2,285,477.

The silica sols are mixed with a basic aluminum chloride. Suitable types of basic aluminum chloride are $Al(OH)_2Cl$ to $Al_3(OH)_8Cl$. The preferred chloride is $Al_2(OH)_5Cl$. The basic aluminum chloride is usually in the form of an aqueous solution when mixed with the silica sol. The procedure of preparing these mixtures is disclosed in Alexander et al., U.S. Pat. No. 3,007,878. Example 1 of this patent is exemplary of preparing the mixtures utilized in the present invention.

In preparing the mixture of positively charged alumina coated silica particles used in this invention, the aluminum to surface $SiO_2$ mol ratio is usually about 1:2 to 2:1 and preferably 1:1.25 to 1.25:1 with the most preferred ratio being 1:1. The silica particle size is about 2 millimicrons to 150 millimicrons and preferably 7 to 30 millimicrons with the most preferred size being 10–15 millimicrons.

The mixture which is obtained by combining the reactants described above is believed to be comprised of silica particles partially coated with positively charged aluminum and free, unattached aluminum salts. This mixture is then aged. Ageing allows more of the free aluminum salt to be adsorbed by the silica. A concomitant reduction in the pH value of the mixture occurs until an equilibrium state is attained. Ageing can be accomplished by letting the mixture stand for several days at room temperature or by heating the mixture at a temperature up to the boiling point of water. The ageing is continued until the decreasing pH of the mixture remains essentially constant. The time required to achieve the constant pH level decreases proportionately with an increase in ageing temperature. Thus, the essentially constant pH is obtained at 25° C. in about 80 hours, at 45° C. in about 6 hours, at 60° C. in about 2 hours, at 80° C. in about 30 minutes and at 90° C. in about 15 minutes. Preferably the ageing temperature is between about 45° to 90° C.

After the pH of the mixture is reduced by heating, an appreciable percentage of the charged aluminum in the mixture still exists as free material, unattached to the colloidal silica particles. It is necessary to reduce this percentage of free aluminum salts by forcing them onto the surface of the silica in order to attain a truly stable positively charged colloid dispersion or positive sol.

Basic material is added in an amount proportional to the amount of aluminum in the mixture. The amount of base added can be as low as 0.032 equivalent per equivalent of aluminum for a positive effect on stability to be seen, or base can be as high as 0.223 equivalent per equivalent of Al, or even higher with more dilute sols. Preferably, the amount of basic material added is 0.09 to 0.17 equivalent per equivalent of Al. The final pH of the positively charged silica sol will usually drop upon standing; this has no effect on stability, however; it is only necessary to add enough basic material as discussed.

The most common basic materials for accomplishing this vital, final step in this inventive process are alkali metal bases such as sodium hydroxide, potassium hydroxide and lithium hydroxide; alkaline earth metal bases such as magnesium hydroxide and calcium hydroxide or the oxides of these metals which, of course, become hydroxides in water; ammonia; water soluble organic bases such as methylamine and ethanolamine. The preferred basic material is magnesium hydroxide (or oxide). Basic materials can be added as aqueous solutions or dispersions or as solid, finely divided reagent; ammonia can be added as a gas, as can volatile organic bases.

The improved process of this invention yields positively-charged silica sols which exhibit excellent stability. This property is extremely critical to the effectiveness of the sol as a commercial product. Positive sols of high solids content, with solids expressed as $SiO_2$ + $Al_2O_3$ as high as 45 percent, and with outstanding stability can be prepared directly without a final concentrating step. The presence of salts formed during this inventive process in no way detracts from the positive sol properties or stability. Positive sols prepared by this inventive process have been stored for as long as four years without any detrimental effects of gelling or precipitation of the sol components.

EXAMPLE 1

One hundred thirty two pounds of "Ludox" HS colloidal silica containing 40% $SiO_2$ by weight, the silica particles having an average particle size of 12 to 15 millimicrons and a specific surface area of about 215 m²/g. $SiO_2$, is adjusted to pH 7.50 with 821 g. of a 1:1 mixture of concentrated hydrochloric acid and water.

The silica sol then is mixed with 30.5 lbs. of 50 percent chlorhydrol ($Al_2(OH)_5Cl$) and 22.2 lbs. water by introducing it at a rate of 25 lb./min. into a centrifugal pump circulating the basic aluminum chloride solution. A clear, intermediate product of pH 4.25 and 15.0 cps viscosity is obtained. A sample of this intermediate product, which is described in U.S. Pat. No. 3,007,878, gelled within 2 weeks when stored at 140° F.

This product is heated to 70° C. over a period of 45 min. and at 70° C. for 1 hr. To the cooled, circulated sol of pH 3.80 finally is added dilute ammonium hydroxide solution (2.3% $NH_3$) through an inlet tube into the pump to give 0.14 equivalents $NH_3$ per equivalent aluminum.

The clear, exceptionally stable positive sol contains 25.96% $SiO_2$, 4.11% $Al_2O_3$, 1.35% Cl, and 0.19% $NH_3$. It is stable for 4 months at 140° F. The mol ratio of Al to surface silica is 1:1. The sol has a viscosity of 8.0 cps and a specific conductivity of 29,000 micromhos/cm. at 75° F.

EXAMPLE 2

Two hundred sixty four pounds of the silica sol described in Example 1 is mixed with 62.8 lbs. 50 percent chlorhydrol and 61.7 lbs. water using the centrifugal pump system described in Example 1. The clear, fluid intermediate product is heated to 60° C. in one-half hr. and at 60° C. for 2 hrs., cooled to 20° C., and stirred with a lightening mixer as well as circulated with the pump as 600 g. magnesium hydroxide dispersed in 1,800 g. water is introduced in 5 min. This is equal to 0.139 equivalents $Mg(OH)_2$ per equivalent Al. Agitation and circulation is continued for 2 hours.

The clear, very stable product contains 26.4% $SiO_2$, 4.2% $Al_2O_3$, 1.0% Cl, and 0.23% MgO. The mol ratio of Al to surface $SiO_2$ is 1:1. The product has a viscosity of 15 cp and a specific conductivity of 30,500 micromhos/cm. at 75° F.

EXAMPLE 3

Six hundred grams of "Ludox" TM colloidal silica containing 50% $SiO_2$ by weight, the silica particles having an average particle size of 21 to 25 millimicrons and a specific surface area of about 130 m²/g, is diluted to 37.6% $SiO_2$ with 197 g. water and the sol is added to 210 g. 25 percent chlorhydrol in a belnder. The product has a pH of 4.70 and viscosity of 7.0 cp.

The product is then warmed at 80° C. for 30 min., cooled, and a dilute ammonium hydroxide solution is added to the product in a blender. 0.138 equivalents of $NH_3$ per equivalent of Al is added.

The clear sol is stable for 5 months at 140° F. and has a composition of 29.8% $SiO_2$, 2.5% $Al_2O_3$, 0.9% Cl, and 0.115% $NH_3$. The mol ratio of Al to surface $SiO_2$ is 1:1. Viscosity of the sol is 7.5 cp and the specific conductivity is 15,200 micromhos/cm.

EXAMPLE 4

Two thousand grams of the silica sol described in Example 3 is mixed with 355 g. chlorhydrol and 359 g. water in a large blender. The clear intermediate product has a pH of 4.25 and a viscosity of 40 cp.

The product is warmed for about 5 hours at 45° C., cooled to 25° C. and a slurry of magnesium hydroxide is added to give 0.156 equivalent $Mg(OH)_2$ per equivalent Al.

The clear, very stable sol has a composition of 34.6% $SiO_2$, 3.24% $Al_2O_3$, 1.01% Cl, and 0.18% MgO. The mol ratio of Al to surface $SiO_2$ is 1:1. Viscosity of the sol is 23.4 cp and specific conductivity is 18,200 micromhos/cm. at 75° F.

EXAMPLE 5

Seven hundred fifty grams of "Ludox" LS colloidal silica containing 30% $SiO_2$ by weight, the silica particles having an average particle size of about 12 to 15 millimicrons and a specific surface area of about 215 m²/g. is added to 130 g. 50 percent chlorhydrol and 295 g. water in a blender. The clear sol is then warmed at 90° C. for 15 minutes, cooled, and finely powdered $Mg(OH)_2$ is fed in as dry solid. 0.143 equivalents base per equivalent Al is added. The stable product contains 20.1% $SiO_2$, 2.67% $Al_2O_3$, 1.0% Cl, and 0.15% MgO, corresponding to a mol ratio of Al to surface $SiO_2$ of 1:1. The conductivity is 22,300 micromhos/cm. at 75° F., and the viscosity is 6.0 cp.

EXAMPLE 6

Example 1 is repeated using a dilute solution of methylamine in water to add 0.165 equivalent base per equivalent Al.

EXAMPLE 7

Example 1 is repeated using a dilute solution of monoethanolamine in water to add 0.155 equivalent base per equivalent Al.

EXAMPLE 8

Example 1 is repeated using a solution of sodium hydroxide in water to add 0.132 equivalent base per equivalent Al.

EXAMPLE 9

Example 5 is repeated using a finely powdered calcium hydroxide slurried in water to add 0.145 equivalent base per equivalent Al.

EXAMPLE 10

Example 5 is repeated using a dilute solution of lithium hydroxide to add 0.150 equivalent base per equivalent Al.

EXAMPLE 11

Two thousand grams of the silica sol described in Example 3 is diluted with 500 g. water to 40% $SiO_2$ and added to 360 g. 50 percent chlorhydrol and 759 g. water in a blender. The product has a pH of 4.45 and a viscosity of 4.0 cp.

The product is then allowed to stand at room temperature for 2 weeks, and postadjusted in the blender with solution of potassium hydroxide in water. 0.145 equivalent base per equivalent Al is added.

The clear, stable sol has 27.6% $SiO_2$, 2.4% $Al_2O_3$, and 0.85% Cl. The mol ratio of Al to surface $SiO_2$ is 1:1. The viscosity of the sol is 9.0 cp.

EXAMPLE 12

One thousand three hundred and fifty grams of "Ludox" SM colloidal silica containing 15% $SiO_2$ by weight, the silica particles having an average particle size of 7 to 9 millimicrons and a specific surface area of about 370 m²/g, is added to 850 g 25 percent chlorhydrol in a Waring Blendor. The product has a pH of 4.5 and a viscosity of 5.0 cps.

The product is then warmed at 90° C. for 10 min., cooled, and postadjusted in the blender with a dilute ammonium hydroxide solution to give 0.154 equivalent base per equivalent Al.

The clear, very stable sol has a composition of 19.2% $SiO_2$, 4.6% $Al_2O_3$, and 1.7% Cl. The mol ratio of Al to surface $SiO_2$ is 2:1. Viscosity of the sol is 4.0 cp, and specific conductivity is 22,000 micromhos/cm.

EXAMPLE 13

Fifteen hundred grams of "Ludox" LS colloidal silica described in Example 5 is added to 130 g 50 percent chlorhydrol and 720 g water in a Waring Blendor. The clear sol is warmed at 60° C. for 2 hours, cooled, and 0.125 equivalent base per equivalent Al is added to the blender using dilute ammonium hydroxide solution. The stable product contains 19.1% $SiO_2$, 1.33% $Al_2O_3$, and 0.5% Cl, corresponding to a mol ratio of Al to surface $SiO_2$ of 1:2.

EXAMPLE 14

82.80-lbs. "Ludox" HS containing 31.11 percent solids is acidified with 0.48-lb. 23° Be' hydrochloric acid to pH 7.5 by simply feeding the HCl into the agitated "Ludox." 15.28-lbs. 50 percent aluminum chlorhydroxide (chlorhydrol) solution is circulated through a tee mixer designed for a mixing time of 0.18 second or less and the acidified "Ludox" is added to the circulating stream. The sol is heated to 65° C. and held for one-half hour with agitation. The batch is then cooled. A 17 percent slurry of 0.22-lb. MgO in water is added over one-half hour with good agitation. The amount added is sufficient to give 0.20% MgO in the finished product plus a 10 percent excess to allow for incomplete reaction. Following the MgO addition, the sol is held at room temperature for one-half hour. Solid particles are filtered from the product. The product contains 26.0% $SiO_2$, 4.0% $Al_2O_3$, 0.20% MgO.

What is claimed is:

1. In a process for preparing a positively charged alumina coated silica sol where an alkaline aquasol of colloidal silica particles is mixed with an aqueous solution of basic aluminum chloride to yield the positively charged silica sol, the improvement imparting stability to said positively charged silica sol which comprises heating the mixture at a temperature within the range of 45° – 90° C. until the pH of the mixture reaches an essentially constant value and then adding to said mixture from 0.032 to 0.223 equivalents of a basic material selected from the group consisting of an alkali metal base, an alkaline earth metal base, ammonium hydroxide, a water soluble organic base and mixtures thereof per equivalent of aluminum.

2. An improved process as in claim 1 where said basic aluminum chloride is $Al_2(OH)_5Cl$.

3. An improved process, as in claim 2, where said colloidal silica particles have an average particle size of from 7 to 30 millimicrons and the mol ratio of aluminum to surface $SiO_2$ of said silica particles is from 1:2 to 2:1.

4. An improved process, as in claim 1, where said constant pH is 4.2 or below.

5. An improved process as in claim 1 where said basic material is magnesium hydroxide, magnesium oxide, sodium hydroxide, potassium hydroxide, lithium hydroxide, calcium hydroxide, ammonium hydroxide, methylamine or monoethanolamine.

6. An improved process as in claim 5 where said basic material is magnesium hydroxide.

7. An improved process as in claim 5 where said basic material is a dilute solution of ammonium hydroxide.

8. An improved process as in claim 5 where from 0.09 to 0.17 equivalents of said basic material is added to the mixture per equivalent of aluminum.

9. A positively charged silica sol containing an aged mixture of negatively charged alumina coated silica sol at a mol ratio of aluminum to surface $SiO_2$ of from about 1:2 to about 2:1 which is stabilized with about 0.032 to about 0.223 equivalents of an alkali metal base, an alkaline earth metal base, ammonia, a water soluble organic base or mixture thereof per equivalent of aluminum in the aged mixture.

* * * * *